US005652913A

United States Patent [19]
Crick et al.

[11] Patent Number: 5,652,913

[45] Date of Patent: Jul. 29, 1997

[54] SYSTEM FOR PROVIDING INTERCOMMUNICATION OF I/O ACCESS FACTORS STORED IN A SHARED DATA STRUCTURE, ACCESSED AND MAINTAINED BY BOTH FILE SYSTEM AND DEVICE DRIVER

[75] Inventors: Andrew P. R. Crick, Woodinville; Seetharaman Harikrishnan, Bellevue; Harish K. Naidu; William G. Parry, both of Redmond, all of Wash.

[73] Assignee: Microsoft Corporation, Redmond, Wash.

[21] Appl. No.: 960,799

[22] Filed: Oct. 13, 1992

[51] Int. Cl.⁶ ............................ G06F 13/14; G06F 13/36
[52] U.S. Cl. ......................... 395/856; 395/800; 395/840
[58] Field of Search ........................... 364/900, 300; 395/600, 275, 800, 700, 821, 840, 841, 856

[56] References Cited

U.S. PATENT DOCUMENTS

| | | | |
|---|---|---|---|
| 4,768,150 | 8/1988 | Chang et al. | 364/300 |
| 4,993,030 | 2/1991 | Krakauer et al. | 371/40.1 |
| 5,029,125 | 7/1991 | Sciupac | 364/900 |
| 5,175,855 | 12/1992 | Putnam et al. | 395/700 |
| 5,222,062 | 6/1993 | Sharma et al. | 370/56 |
| 5,245,702 | 9/1993 | McIntyre et al. | 395/164 |
| 5,287,504 | 2/1994 | Carpenter et al. | 395/600 |

*Primary Examiner*—Thomas C. Lee
*Assistant Examiner*—Rehana Krick
*Attorney, Agent, or Firm*—Seed and Berry LLP

[57] ABSTRACT

A method and system for providing intercommunication of I/O access factors between a file system and device driver, described as follows. A factor data block is provided which stores I/O access factors used by a file system and a device driver. The file system performs application program requests to access files by providing appropriate file system requests to the device driver based on the I/O access factors. The device driver performs the file system requests by controlling access to an appropriate peripheral device based on the I/O access factors. In a preferred embodiment, the I/O access factors include real time status data indicating a current status of I/O processing. The I/O access factors also include device constraint data indicating limitations of the peripheral devices. During an I/O access, the file system reads the real time status data and device constraint data and performs an application program request based on the real time status data and device constraint data, passing a file system request to the device driver. The device driver reads the real time status data and performs the file system request based on the real time status data.

23 Claims, 3 Drawing Sheets

SYSTEM FOR PROVIDING INTERCOMMUNICATION OF I/O ACCESS FACTORS STORED IN A SHARED DATA STRUCTURE, ACCESSED AND MAINTAINED BY BOTH FILE SYSTEM AND DEVICE DRIVER

TECHNICAL FIELD

The present invention relates to the field of I/O systems and, more particularly, to a method and system for providing intercommunication of real time status data and device constraints between a file system and device driver.

BACKGROUND OF THE INVENTION

A typical computer system has a computer connected to various peripheral devices. The computer has an operating system having a file system and device driver. The file system manages files and handles requests by application programs to access the files. The device driver controls I/O access to the peripheral devices.

In the typical computer system, both the file system and device driver maintain various real time status data to perform their respective functions. As an example, the file system maintains real time status data indicating a number of I/O access requests currently queued. As another example, the device driver maintains real time status data indicating whether a floppy disk drive controlled thereby is currently inaccessible.

In many instances, it would be valuable to computer system efficiency for the file system to have real time access to the real time status information within the device driver. Similarly, it would be valuable to computer system efficiency for the device driver to have real time access to the real time status information maintained by the file system.

Previously, however, the potential value of such real time access has not been recognized, and such real time access has not been available between the file system and device driver. Conventional file systems and device drivers have instead functioned independently of each other, communicating only with respect to specific I/O access operations requested by the file system of the device driver. Furthermore, such communication has been in delayed rather than real time. As a result, previous file systems have been unable to take advantage of real time status data maintined by a device driver. Likewise, previous device drivers have been unable to take advantage of real time status data maintained by a file system.

A similar limitation of previous computer systems is that information regarding peripheral device limitations has been unavailable to the file system. Typically, the device driver maintains device constraint information indicating limitations of a peripheral device or devices it controls. Previously, the potential value of providing such device contraint data to the file system also has remained unrecognized, and such device constraint data has remained unavailable to the file system. As a result, previous file systems have been unable to take advantage of device constraint data available to the device driver.

SUMMARY OF THE INVENTION

An object of the invention is to provide intercommunication of I/O access factors between a file system and device driver.

An object of the invention is to provide a file system with access to real time status data maintained by a device driver.

An object of the invention is to provide a device driver with access to real time status data maintained by a file system.

An object of the invention is to provide a file system with device constraint data maintained by a device driver.

These and other objects are obtained by a method and system for providing intercommunication of I/O access factors between a file system and device driver, described as follows. A factor data block is provided which stores I/O access factors used by a file system and a device driver. The file system performs application program requests to access files by providing appropriate file system requests to the device driver based on the I/O access factors. The device driver performs the file system requests by controlling access to an appropriate peripheral device based on the I/O access factors.

In a preferred embodiment, the I/O access factors include real time status data indicating a current status of I/O processing. The I/O access factors also include device constraint data indicating limitations of the peripheral devices. During an I/O access, the file system reads the real time status data and device constraint data and performs an application program request based on the real time status data and device constraint data, passing a file system request to the device driver. The device driver reads the real time status data and performs the file system request based on the real time status data.

DETAILED DESCRIPTION OF THE INVENTION

Figure 1:
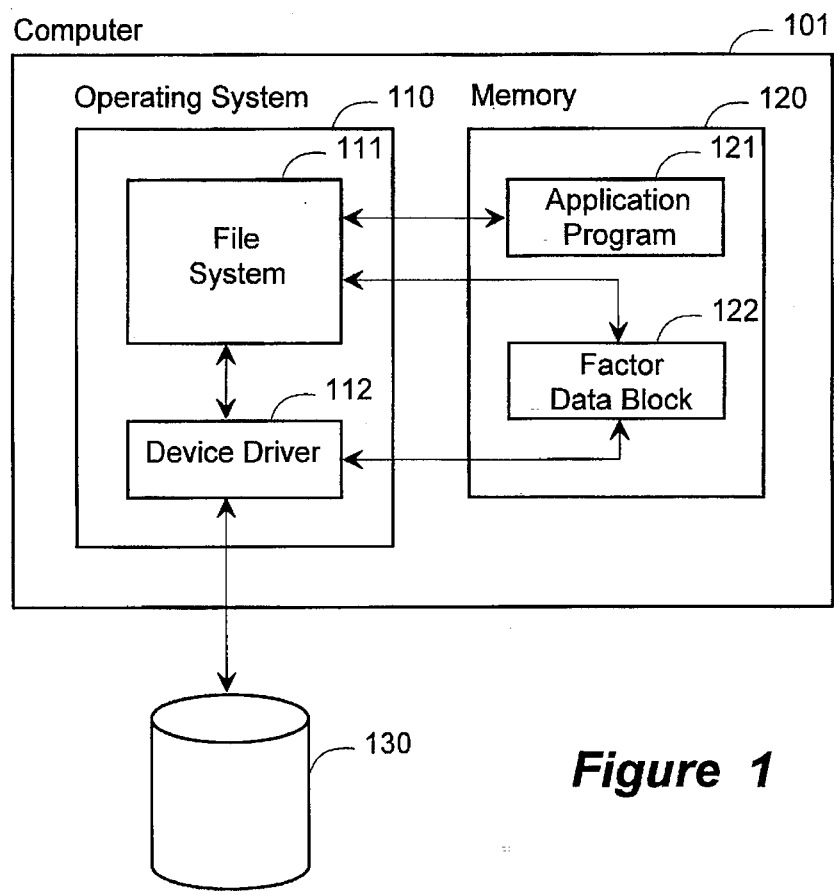
FIG. 1 is a block diagram of a computer system in accordance with the present invention. structure of the factor data block.

FIG. 1 is a block diagram of a computer system which implements the present invention. The inventive computer system comprises a computer 101 having an operating system 110 and a memory 120, and is connected to a peripheral device (disk) 130. The operating system includes, among many other well-known features of an operating system (not shown), a file system 111 and device driver 112. The memory stores an application program 121 and a factor data block 122.

The file system 111 performs application program requests obtained from the application program 121 to access data. For example, the file system receives a request from the application program 121 to read a named file. The file system converts this request into a file system request to read data from a particular location on the disk 130. The file system then passes the file system request to the device driver 112.

The device driver 112 performs file system requests obtained from the file system. For example, the device driver obtains a file system request to read data from a particular location on the disk 130. The device driver controls the peripheral device 130 to service the file system request, and then passes the data read from the disk 130 back to the file system 111, which provides the application program 121 with the data represented by the requested named file. It should be noted that, although only one peripheral device and device driver are shown in FIG. 1 for the sake of simplicity, any number of device drivers can be provided for any number of corresponding devices.

The inventive computer system provides the factor data block 122 to both the file system 111 and the device driver 112 as a shared data structure. In a preferred embodiment, both the file system 111 and device driver 112 read I/O access factors from the factor data block 122 while processing an I/O access as described above. As a result, the file system 111 performs the application program requests based on the I/O access factors stored by the device driver 112 into the factor data block, thereby localizing processing decisions in the file system to improve computer system efficiency. Also as a result, the device driver 112 performs the file system requests based on the I/O access factors stored by the file system 111 into the factor data block, thereby localizing processing decisions in the device driver to improve computer system efficiency.

Figure 2:
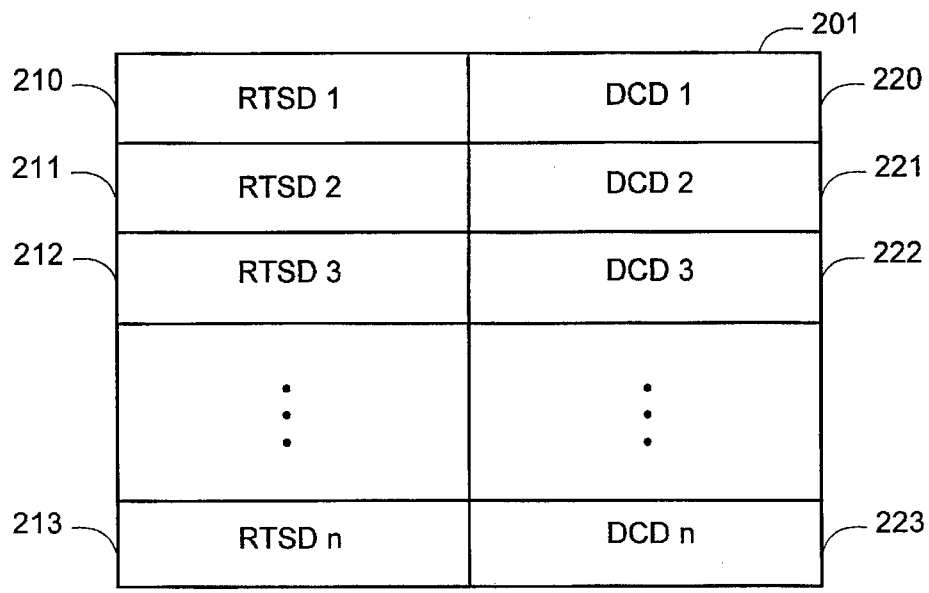
FIG. 2 is an illustration of the data structure of the factor data block.

FIG. 2 is an illustration of the data structure of the factor data block. It should be noted that, where multiple device drivers are provided, a factor data block is provided for each device driver. The preferred factor data block 201 stores two basic types of I/O access factors: real time status data and device constraint data. The real time status data entries RTSD 1–RTSD n (210–213) in the factor data block each store real time status data indicating a current status of I/O processing. As an example, the device driver 112 stores as RTSD 2 a DOOR OPEN status indicating that a floppy disk drive controlled thereby has an open door, and is therefore currently inaccessible. The file system 111 reads RTSD 2 from the factor data block while performing an application program request. If RTSD 2 indicates a DOOR OPEN status, the file system determines whether data cached from the floppy disk resident on the floppy disk drive has been replaced. If the cached data has not been replaced, the file system determines that the cached data can be relied upon to accurately represent data from the floppy disk.

Specifically, as is well known in the art, a file system such as the file system 111 often caches a limited but useful amount of data recently read to or written from the various media it is requested to access. After so much time has passed (a cycle) since an existing portion of cached data has been accessed, the existing portion of cached data is replaced by newly cached data. This replacement is based on the probability that the newly cached data is more likely than the replaced data to be accessed again by the file system.

Thus, upon determining via the DOOR OPEN status stored in RTSD 2 that the corresponding disk is inaccessible, the file system 111 determines whether a cycle of time has passed such that any data from the inaccessible disk currently cached has been replaced. If not, the file system determines that any data that has been cached from the inaccessible disk is accessible via the file system cache. As a result, the file system does not have to request that the device driver determine whether the cached data has been replaced, and computer system efficiency is thereby improved.

Although an example of real time status data have been described above, a number of cases exist in which status data currently is maintained in, but not communicated between, file systems and device drivers of existing systems. One of ordinary skill in the art would recognize in view of the teachings of the present invention, that the invention method and system can be implemented to maintain a variety of types of real time status data which in the factor data block 122 of the present invention.

As noted above, the factor data block 201 also stores device constraint data. The device constraint data entries DCD 1–DCD n (220–223) each store device constraint data indicating a limitation of a peripheral device controlled by the device driver 112. For example, the device driver 112 stores as DCD 1 an EVEN BUFFER requirement. This requirement indicates that the disk 130 requires the device driver to utilize even byte-aligned buffering when accessing the disk 130. The file system 111 reads DCD 1 from the factor data block 201 and caches the data in accordance with the even byte alignment. As a result, it is not necessary for the device driver 112 to convert the accessed data to and from an even byte-alignment.

In a preferred embodiment of the invention, the device constraint data is obtained during configuration of the device driver. The device constraint data is, for example, obtained in the form of configuration requirements imposed during configuration among multiple component drivers which compose the device driver. An example of such a process is described in detail in U.S. patent application Ser. No. 07/954,677, entitled METHOD AND SYSTEM FOR CONFIGURING AND EXECUTING DEVICE DRIVERS BASED ON CONFIGURATION REQUIREMENTS, which is herein incorporated by reference.

Figure 3:
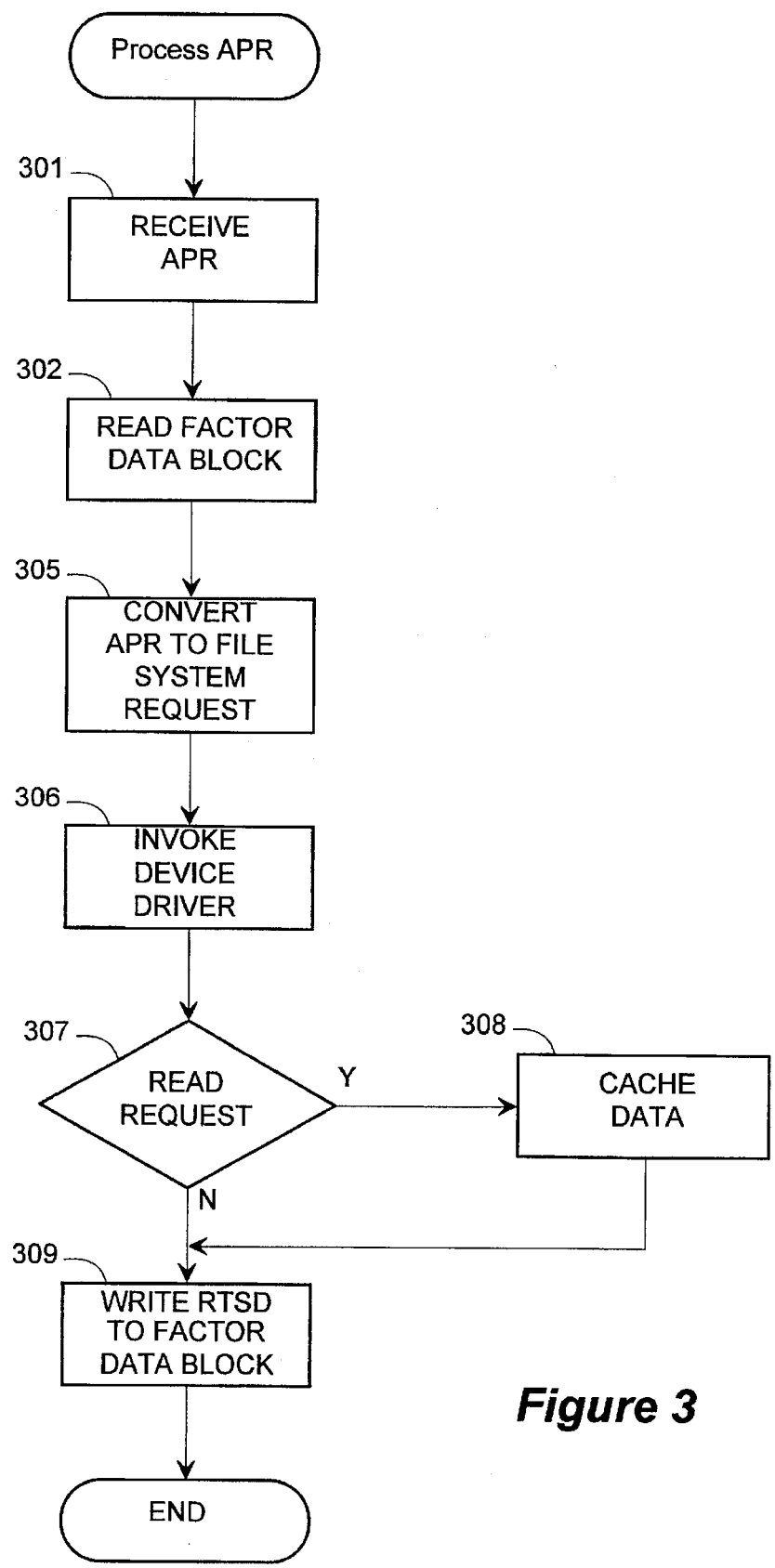
FIG. 3 is a flow diagram of the routine performed by the file system 111 in processing an application program request.

FIG. 3 is a flow diagram of the routine (Process APR) performed by the file system 111 in processing an application program request. In step 301, the routine receives from the application program 121 an application program request (APR) to access data from a named file. In step 302, the routine reads the real time status data and device constraint data from the factor data block 122. In step 305, the Process APR routine performed by the file system converts the application program request to a file system request. For example, the routine converts a request to read a named file to a request to read an actual media location where the named file is stored. In step 306, the routine invokes the device driver 112, passing it the file system request. Processing of the file system request by the device driver 112 will be described presently, with reference to FIG. 4.

In step 307, the Process APR routine determines whether the application program request originally obtained from the application program was a read request. If so, the routine caches in step 308 the data that has been read and the proceeds to step 309. If not, the routine proceeds directly to step 309. As explained above, the file system 111 caches the data in accordance with the real time status data and device constraint data read from the factor data block 122. For example, where the real time status data indicates that a peripheral device is inaccessible, data that has been cached from that peripheral device is maintained within the cache and not replaced in caching the data that has been read.

In step 309, when the Process FSR routine returns and any read data has been cached the routine writes real time status data to the factor data block 122 indicating the current status of I/O processing, such as the number of I/O requests that are currently queued. In a preferred embodiment, asynchronous I/O is provided such that step 309 is performed at any point within the routine upon receiving an interrupt from the operating system 110 informing the routine that a real time status data entry has changed. For simplicity of explanation, however, step 309 is shown at the end of the Process APR routine as it would be provided in a synchronous I/O environment. The routine then ends.

Figure 4:
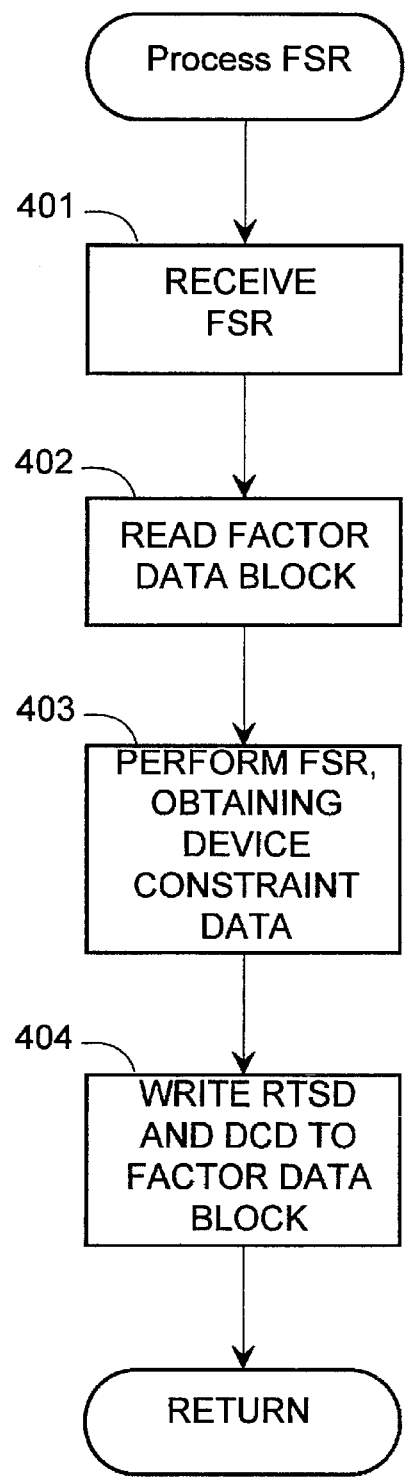
FIG. 4 is a flow diagram of the routine performed by the device driver 112 in processing a file system request.

FIG. 4 is a flow diagram of the routine performed by the device driver 112 in processing a file system request. In step 401, the routine receives the file system request from the file system 111. In step 402, the routine reads the real time status data from the factor data block. In step 403, the routine performs the file system request by performing peripheral device-specific processing. Such peripheral device-specific processing is well-known to one of ordinary skill in the art. In performing step 403, the routine also obtains device constraint data. As explaned above with reference to the above-incorporated application, the device constraint data is, for example, obtained as a configuration requirement imposed during configuration among multiple component drivers which compose the device driver.

In step 404, the routine writes real time status data to the factor data block 122 indicating the current status of I/O processing, such as the DOOR OPEN status explained above. In a preferred embodiment, asynchronous I/O is provided such that step 404 is performed at any point within the routine upon receiving an interrupt from the operating system 110 informing the routine that a real time status data entry has changed. For simplicity of explanation, however, step 404 is shown at the end of the Process FSR routine as it would be provided in a synchronous I/O environment. The routine then returns to the Process APR routine.

We claim:

1. A method, performed by a computer having a file system and device driver, for providing intercommunication of I/O access factors between the file system and the device driver, the method comprising the steps of:

storing the I/O access factors in a factor data block that is a shared data structure accessible by both the file system and the device driver;

wherein the I/O access factors include real time status data maintained by both the file system and the device driver;

performing within the file system, based on the I/O access factors stored within the factor data block, an application program request to access data, passing a corresponding file system request to the device driver; and performing within the device driver, based on the I/O access factors stored in the factor data block, the file system request to thereby access the data requested by the application program request.

2. The method of claim 1 wherein the step of performing the application program request comprises reading said real time status data from the factor data block, the real time status data indicating a current status of I/O processing.

3. The method of claim 1 wherein the step of performing the file system request comprises reading a device constraint from the factor data block, the device constraint data indicating a limitation of a peripheral device.

4. The method of claim 1 wherein the step of performing the application program request comprises reading device constraint data from the factor data block, the device constraint data indicating a limitation of a peripheral device.

5. The method of claim 4 wherein the step of reading device constraint data comprises reading a configuration requirement of a component driver within the device driver.

6. The method of claim 1 wherein the step of performing the application program request comprises storing said real time status data into the factor data block, the real time status data indicating a current status of I/O processing.

7. The method of claim 1 wherein the step of performing the file system request comprises storing said real time status data into the factor data block, the real time status data indicating a current status of I/O processing.

8. The method of claim 1 wherein the step of performing the file system request comprises storing device constraint data into the factor data block, the device constraint indicating a limitation of a peripheral device.

9. The method of claim 8 wherein the step of reading device constraint data comprises reading a configuration requirement of a component driver within the device driver.

10. A method, performed by a file system within a computer having the file system and a device driver, for performing an application program request to access data, the method comprising the steps of:

reading an I/O access factor from a factor data block that is a shared data structure accessible by both the file system and the device driver;

wherein the I/O access factor includes real time status data maintained by both the file system and the device driver; and performing the application program request based on the I/O access factor, providing a corresponding file system request to the device driver to access the data.

11. The method of claim 10 wherein the step of reading the I/O access factor comprises reading an I/O access factor previously stored by the device driver in the factor data block.

12. The method of claim 10 wherein the step of performing the application program request comprises converting the application program request from a request to read data from a file to a request to read the data from a particular location wherein the data from the file is located.

13. The method of claim 10 wherein the step of performing the file system request comprises converting the application program request from a request to read data from a file to a request to read the data from a particular media location.

14. The method of claim 10, further comprising the step of writing a second I/O access factor to the factor data block.

15. The method of claim 10 wherein the I/O access factor comprises device constraint data indicating a limitation of a peripheral device.

16. A method, performed by a device driver within a computer having a file system and the device driver, for performing an application program request to access data, the method comprising the steps of:

reading an I/O access factor from a factor data block that is a shared data structure accessible by both the file system and the device driver;

wherein the I/O access factor includes real time status data maintained by both the file system and the device driver; and performing the file system request based on the I/O access factor to thereby access the data.

17. The method of claim 16 wherein the step of reading the I/O access factor comprises reading an I/O access factor stored by the file system into the factor data block.

18. The method of claim 16 further comprising the step of writing a second I/O access factor to the factor data block.

19. The method of claim 16 wherein the I/O access factor comprises device constraint data indicating a limitation of a peripheral device.

20. A computer system comprising:

a peripheral device; and a computer comprising:

an application program, a factor data block having I/O access factors, and an operating system having a file system accessing the factor data block and performing an application program request of the application program based on the I/O access factors stored in the factor data block, and having a device driver accessing the factor data block and performing a file system request of the file system to access the peripheral device based on the I/O access factors stored in the factor data block, wherein the factor data block is a shared data structure that is accessible by both the file system and the device driver; and wherein the I/O access factors include real time status data maintained by both the file system and the device driver.

21. The computer system of claim 20 wherein the I/O access factors comprise device constraint data indicating a limitation of a peripheral device.

22. The computer system of claim 21 wherein the device constraint data comprises a configuration requirement of a component driver within the device driver.

23. A method, performed by a computer having a file system and device driver, for providing intercommunication of I/O access factors between the file system and the device driver, the method comprising the steps of:

storing the I/O access factors maintained by both the file system and the device driver in a factor data block that is a shared data structure accessible by both the file system and the device driver, the I/O access factors including device constraint data;

performing within the file system, based on the I/O access factors stored within the factor data block, an application program request to access data, passing a corresponding film system request to the device driver; and performing within the device driver, based on the I/O access factors stored in the factor data block, the file system request to thereby access the data requested by the application program request.

* * * * *